Aug. 10, 1954 — O. STEINER — 2,686,075
COLLAPSIBLE BODY FOR AUTOMOBILE TRAILERS
Filed Nov. 4, 1949 — 3 Sheets-Sheet 1

Inventor
Oscar Steiner
By Fetherstonhaugh & Co.
Attorneys

Aug. 10, 1954   O. STEINER   2,686,075
COLLAPSIBLE BODY FOR AUTOMOBILE TRAILERS
Filed Nov. 4, 1949   3 Sheets-Sheet 2
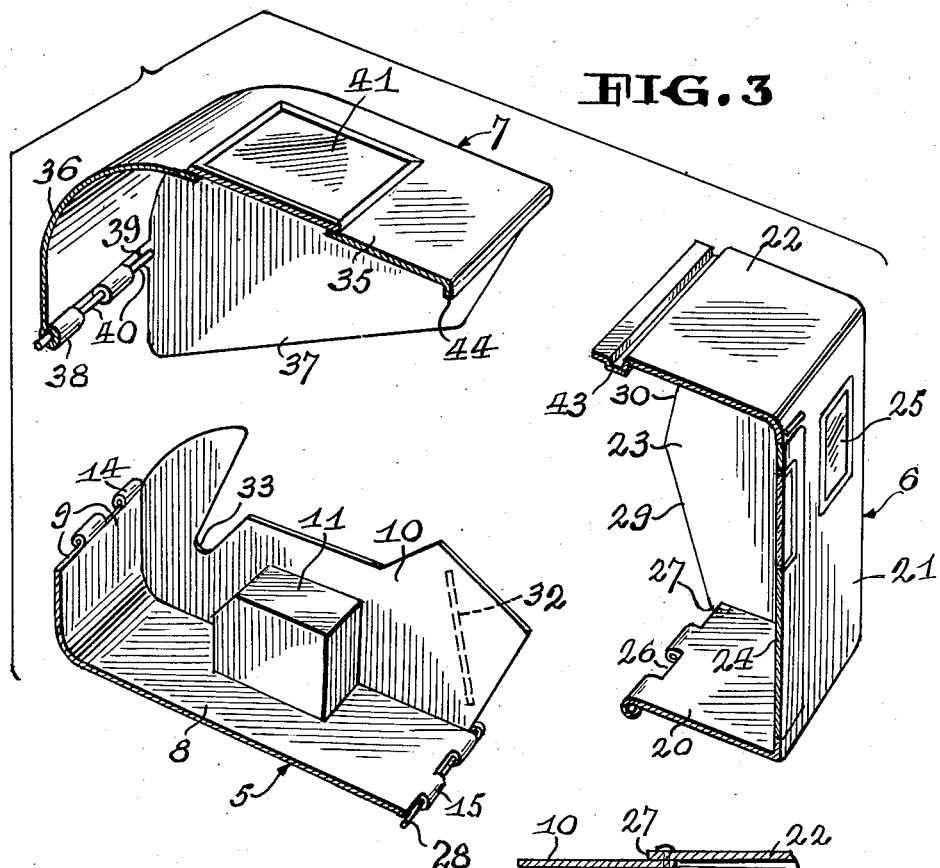
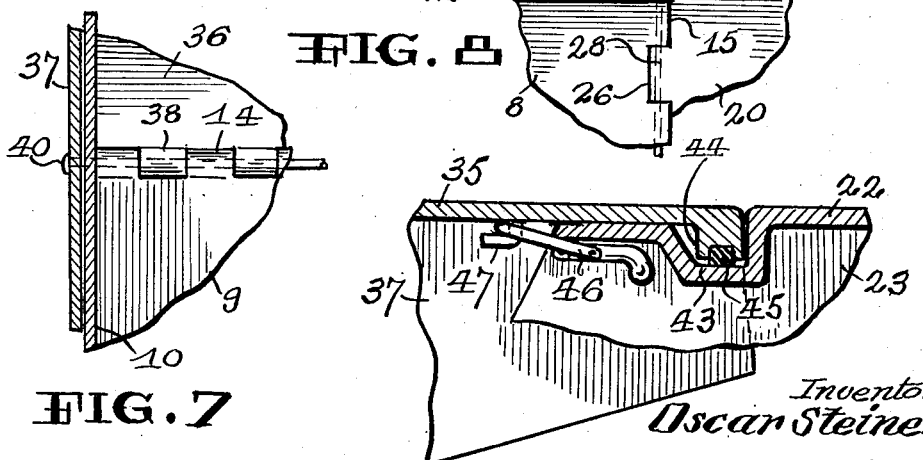
Inventor
Oscar Steiner
By Fetherstonhaugh & Co.
Attorneys Aug. 10, 1954   O. STEINER   2,686,075
COLLAPSIBLE BODY FOR AUTOMOBILE TRAILERS
Filed Nov. 4, 1949   3 Sheets-Sheet 3
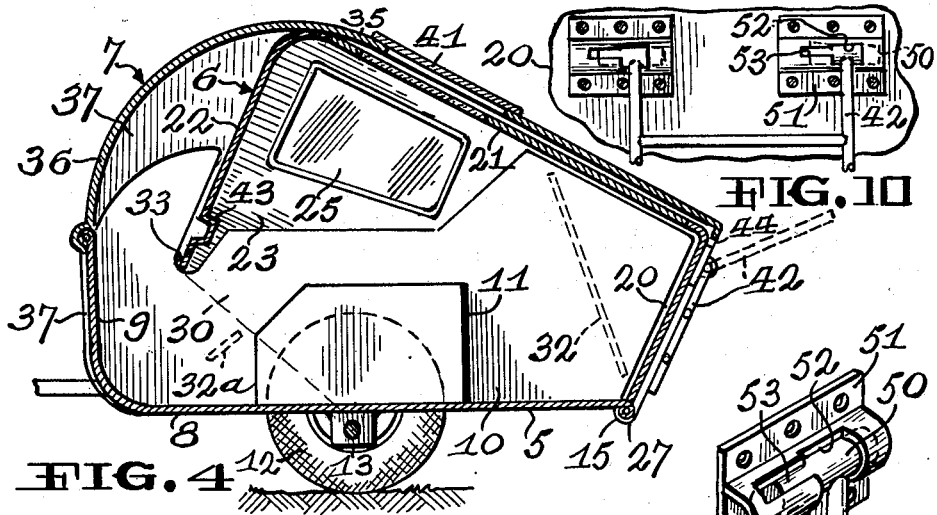
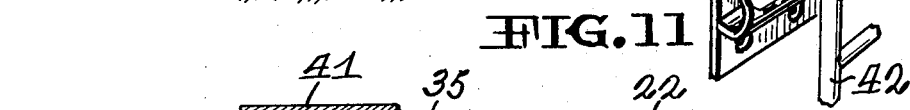
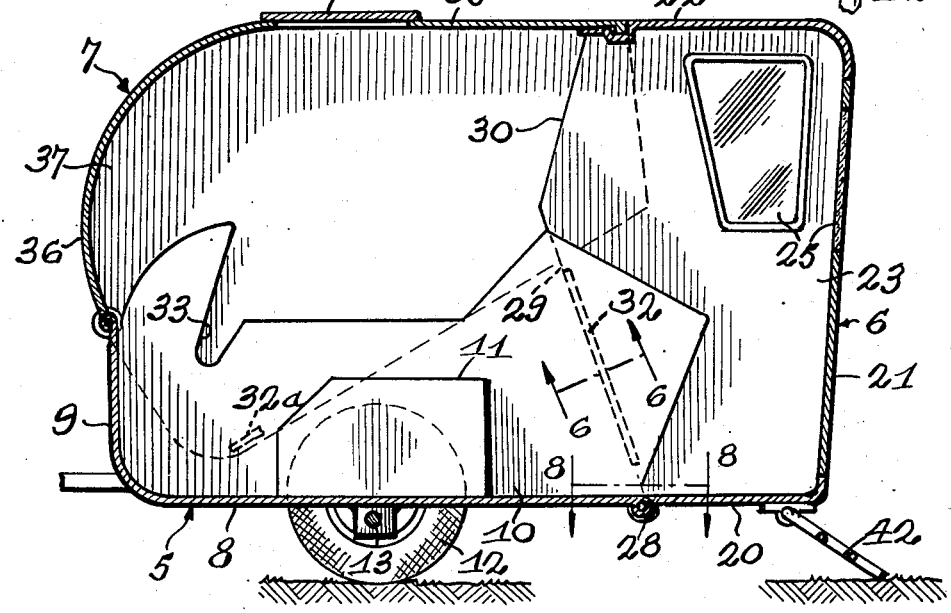
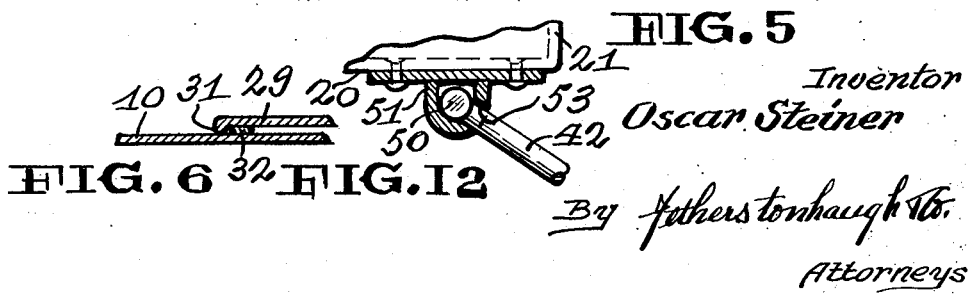
Inventor
Oscar Steiner
By Featherstonhaugh & Co.
Attorneys Patented Aug. 10, 1954

2,686,075

UNITED STATES PATENT OFFICE 2,686,075

COLLAPSIBLE BODY FOR AUTOMOBILE TRAILERS

Oscar Steiner, Montreal, Quebec, Canada

Application November 4, 1949, Serial No. 125,423

5 Claims. (Cl. 296—23)

This invention relates to improvements in automobile trailer construction.

A particular object of my invention is to provide a collapsible trailer construction composed of three main assembly sections, two of which are separately hinged to the remaining section to swing about horizontal axes of rotation to positions of extension or collapse.

Another object is to provide a collapsible trailer construction comprising three main assembly sections including a lower stationary body section, a second body section hingedly secured to one end of said stationary section to swing about a horizontal axis in the longitudinal direction of the trailer to a vertical upright position or to a collapsed position in overlapping relation to said stationary section, and a third body section hingedly secured to the opposite end of said stationary section to swing about a horizontal axis in combined longitudinal and vertical directions to a position of engagement with said section in its upright position or to a collapsed position overlapping both the stationary and second body sections when the latter is in its collapsed position.

A further object is to provide a novel leverage means for rotation of one of the body sections which is adapted to serve as a support as well as a ladder for the trailer in its opened or extended position.

A still further object is to provide a particularly simple trailer construction consisting of three main assembly sections hingedly connected together and adapted to be readily swung to collapsed or extended positions with comparative ease.

The above and other objects and characteristic features of this invention will more readily be understood from the following detailed description taken in connection with the accompanying drawings, in which—

Fig. 3 is an exploded perspective view in section of the three main assembly sections shown in Fig. 2.

Fig. 4 is a vertical sectional view showing the trailer in its collapsed condition.

Fig. 5 is a vertical sectional vew showing the trailer in its extended condition.

Fig. 6 is a detail view taken along the section lines 6—6 of Fig. 5.

Fig. 7 is a detail view taken along the section lines 7—7 of Fig. 1.

Fig. 8 is a detail view taken along the section lines 8—8 of Fig. 5.

Fig. 9 is a detail view taken along the section lines 9—9 of Fig. 2.

Fig. 10 is a broken detail view in plan of the ladder assembly in relation to the bottom wall of one of the body assembly sections.

Fig. 11 is a detail view in perspective of one of the clamping devices shown in Fig. 10.

Fig. 12 is a sectional detail showing a clamp and one side rail of the ladder assembly shown in Fig. 10 with the rail in its locked position.

Figure 1:
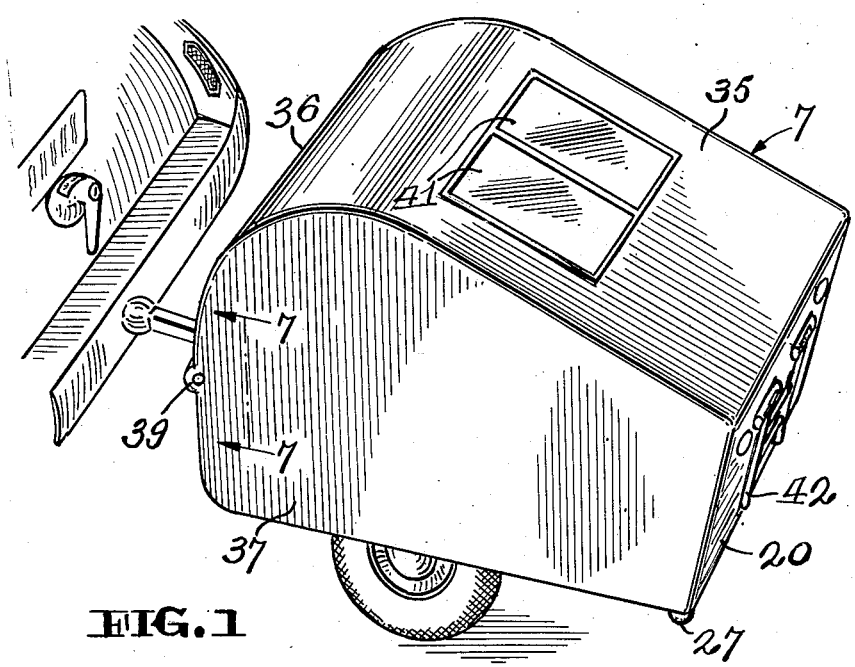
Fig. 1 is a perspective view showing a trailer embodying my invention in its collapsed condition.

Referring more particularly to the drawings, my collapsible trailer is composed of three main assembly sections, namely, a stationary or lower body section 5, a rear extension forming body section 6, hingedly connected at its base in the forward portion thereof to the rear end of lower body section 5 to swing about a horizontal axis to extended and closed positions, the former constituting an upright position adjacent the rear end of section 5 and the latter constituting an inclined position in overlapping relation to the lower body section, and an upper body or hood-forming section 7 hingedly connected at its forward end to the forward end of lower body section 5 to swing about a horizontal axis to open and closed positions normally overlying the body section 5 in the open and closed positions and additionally overlapping the extension section 6 in its closed position.

The lower body section 5 includes a bottom wall 8, bent upwardly at its forward end to form the lower portion 9 of the front wall of the trailer, and side walls 10 secured at their lower and forward ends to the bottom wall 8 and lower portion 9 of the front wall. The upper and rear ends of body section 5 are open. The lower body section is provided with a conventional wheel box 11 at either side thereof for the accommodation of wheels 12 mounted on an axle 13 suitably secured to the bottom of the lower body section in a conventional manner. The upper end edge of front wall portion 9 is provided with spaced hinge knuckles 14 adapted to cooperate with hinge members of the hood-forming section 7 in a manner hereinafter more fully described. Similarly the rear end edge of bottom wall 8 is provided with spaced hinge knuckles 15 cooperating with complementary hinge members of section 6.

The rear extension forming body section 6 comprises a bottom wall 20, rear wall 21, top wall 22 and side walls 23, the front end thereof being open. The rear wall is provided with a door 24 and the side and rear walls with suitable windows 25, all of which are constructed into the extension section in a conventional manner. The front end of bottom wall 20 is provided with hinge knuckles 26 suitably spaced to intermesh with the hinge knuckles 15 of body section 5. The side walls 23 are provided with projections 27 which serve as ring closures for the ends of the intermeshing knuckles 15 and 26. A hinge pin 28 extends through openings in the ring closures 27 and hinge knuckles 15 and 26 to provide a horizontal axis for rotation of the body section 6 relative to the body section 5.

The side walls 23 of body section 6 are arranged to overlap the side walls 10 of lower body section 5 with the inner surface of side walls 23 in face-to-face relation with the outer surface of side walls 10. The front ends of side walls 23 are forwardly inclined in the lower portion 29 from the bottom to a suitable intermediate point and then rearwardly inclined in the upper portion 30 to meet the side edges of top wall 22. The edges along the inclined portions 29 and 30 are inturned, as indicated at 31, to provide a contact between the side walls 23 and 10. When the extension forming body section 6 is upright in its extended position, the inturned edges 31 engage elongated stop members 32 secured to the outer surfaces of side walls 10. Stops 32 limit the rotation of body section 6 about its pivotal axis to a position where the bottom walls 8 and 20 of the two body forming sections 5 and 6 will be in a common plane when the latter is in its extended position.

When the body section 6 is in a closed position, relative to body member 5, the lower portion 29 of the forward end of each side wall 23 is substantially flush with bottom wall 8 and the upper portion 30 is forwardly inclined toward the front end of top wall 22. Recesses 33 in the upper end of side walls 10 receive the front end edge of top wall 22 in supporting engagement.

The upper body or hood-forming section 7 includes a top wall 35 bent downwardly at its front end to form the upper portion 36 of the front wall of the trailer, and side walls 37 secured at their upper and front ends to the top wall 35 and upper portion 36 of the trailer front wall. The lower and rear ends of body section 7 are open and the side walls 37 project downwardly a substantial distance in the forward portion beyond the lower edge of the front wall forming portion 36. The lower end of the front wall forming portion 36 is provided with hinge knuckles 38 suitably spaced to intermesh with the hinge knuckles 14 on the upper end of front wall portion 9. The side walls 37 are provided with projections 39 which serve as ring closures for the ends of the intermeshing hinge knuckles 14 and 38. A hinge pin 40 extends through aligned openings in the ring closures 39 and the hinge knuckles 14 and 38 to provide a horizontal axis for rotation of the body section 7 relative to the lower or stationary body section 5. Conventional light admitting window panels 41 are constructed into the top wall 35.

In the closed position of the trailer, as shown in Figs. 1 and 4, it will be seen that the hood-forming body section 7 completely overlies the body sections 5 and 6. The side walls 37 are arranged outside of and in completely overlapping relation to the side walls 10 and 23 of body sections 5 and 6 to conceal them from view. The top wall 35 and front wall portion 36 overlap the rear wall 21 and top wall 20 respectively of body section 6 in the closed position of the trailer.

Figure 2:
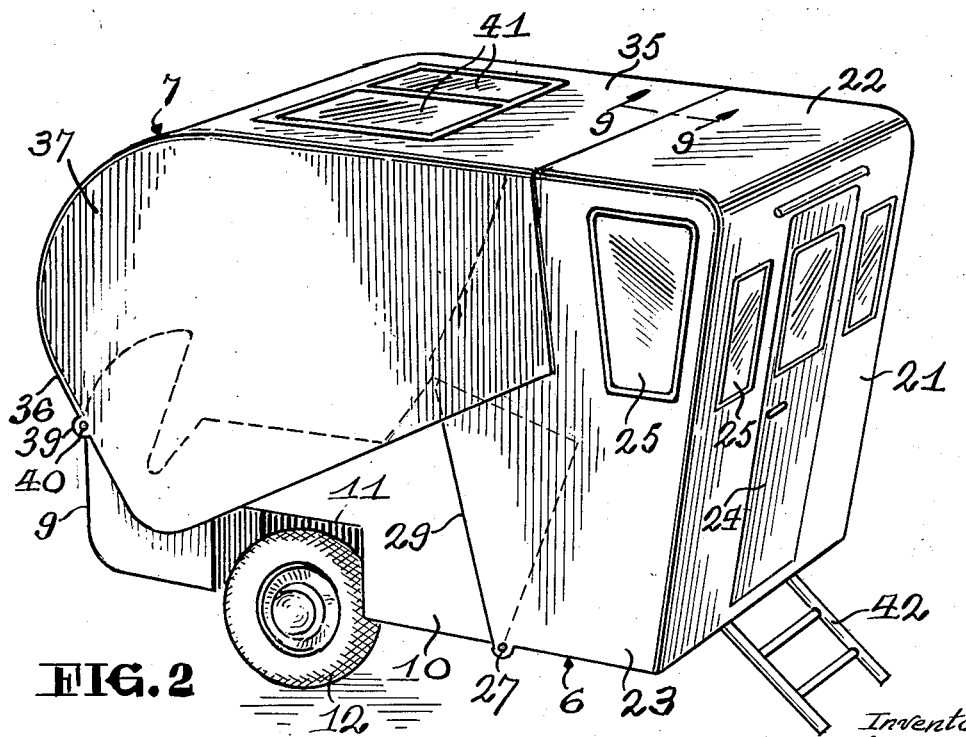
Fig. 2 is a perspective view showing a trailer in its extended condition.

When it is desired to open the trailer to its extended position, as shown in Figs. 2 and 5, body section 7 is first raised by swinging it about its hinge connection to lower body section 5 sufficiently to permit body section 6 to be moved to its extended upright position. Stop members 32a on the outer surface of side walls 10 engage inturned edges of side walls 37 to limit the swinging movement of body section 7 about its pivotal axis. Body section 6 is then pivoted about its hinge connection to the lower body section 5 by means of a step-ladder or other suitable stairway 42 in a manner hereinafter more fully described. Body section 7 is then lowered to close the gap between the body sections 6 and 7. This is accomplished by interlocking the two top walls 22 and 35 of the body sections, as shown in Fig. 9, the one being provided with a transverse groove 43 adjacent its inner end and the other with a marginal tongue extension 44 which is downwardly directed to be fitted in the complementary groove 43. Cushion members 45 provide resilient contact between the aforesaid tongue and groove. The body sections 6 and 7 are releasably secured together by conventional clamping devices including a bail member 46 pivotally mounted on the under side of top wall 22 and adapted to be clamped over a bill hook 47 mounted on the under side of top wall 35.

The ladder or stairway 42 comprising side-rails and spaced rungs or steps therebetween is provided with a bolt 50 at the upper end of each side rail. The bolts are fitted in the bail portion of U-shaped clamps 51 which are secured to the under side of the bottom wall 20 of the body section 6. The bail portions of the clamp are provided with enlarged openings 52 which permit substantial rotation of the ladder about the pivotal axis provided by bolts 50 from a position of abutment against the bottom wall 20. Elongated narrow slots 53 extending from one side of openings 52 permit lateral sliding of bolts 50 for locking engagement of the side rails of ladder 42 when said ladder is swung outwardly to a suitable position from bottom wall 20.

When the ladder is locked in its extended position, as shown in dotted line in Fig. 4, it may be employed as a lever for rotating the body section 6 about its pivotal axis to move said body section to the extended upright position shown in Figs. 2 and 5. When body section 6 is in its upright position, the lower ends of the ladder rest on the ground to serve as a support for the trailer. The ladder also serves to rotate body section 6 to its closed position and it is then moved out of slots 53 to its unlocked position and rotated to its position of abutment against the bottom wall 20.

I claim:

1. A collapsible trailer unit comprising three rigid-wall body sections pivotally connected together to provide for swinging movement of certain of said body sections about fixed horizontal axes, said body sections including a lower forward body section comprising a bottom wall and upwardly extending rigid front and side walls from the front and side edges of said bottom wall, a rear body section comprising a bottom wall pivotally connected at its forward edge to the rear of said first body section bottom wall for swinging movement about a fixed horizontal axis from a position of horizontal alignment to a position extending upwardly from said first body section bottom wall, upwardly extending side and rear walls rigidly connected to each other and to the side and rear edges of said rear body section bottom wall, a top wall rigidly connected to the upper edges of said last mentioned side and rear walls, the side walls connected to the rear body section bottom wall being disposed outwardly of and in overlapping relation with the rear portions of the side walls of said first body section, and a third upper forward body section forming the remaining portion of the trailer unit including a wall member forming the front and top walls of said third body section, the front edge of said wall member being hinged to the upper edge of the front wall of said first body section to swing about a fixed horizontal axis and the rear portion of said wall member being disposed above and in overlapping engagement with the top wall of the rear body section, and side walls rigidly connected to the said wall member of the third body section and having portions thereof disposed outside of and in overlapping relation with the side walls of both the first mentioned lower forward body section and the rear body section.

2. A collapsible trailer as set forth in claim 1, in which said top wall of said rear body section is disposed in a horizontal plane when the rear body section is in an extended upright position, and in which said wall member of the third body section is shaped to provide a straight top wall of substantial length and an outwardly and downwardly curved front wall extending from the forward edge of said last mentioned top wall to the hinged connection with the front wall of said first body section, the length and degree of curvature of said third body section front wall being such that upward swinging movement of the said third body section about its pivotal axis disposes said third body section top wall in a common horizontal plane with the top wall of said rear body section when the latter is in its upright position.

3. A collapsible trailer as set forth in claim 1, in which the said rear body section is swingable about its fixed horizontal axis to a position of collapse, and in which portions of the upper edges of said first body section side walls located rearwardly of and adjacent to the front wall of said first body section are engaged by the forward edge of the top wall of said rear body section when the latter is collapsed for support of said rear body section with its rear wall downwardly inclined toward its bottom wall, and in which the said third body section is downwardly swingable about its fixed horizontal axis to a position of collapse so that the top wall of said third body section is disposed to lie along the length of the outer surface of said rear wall of the rear body section when the latter is supported by the said upper marginal portions of the side walls of said first body section.

4. A collapsible trailer as set forth in claim 1, in which the top wall of said rear body section is provided in its upper surface with a transversely extending groove adjacent the front edge thereof, and in which the said rear portion of said third body section wall member which overlaps the top wall of said rear body section is provided with a downwardly directed, transverse, marginal tongue extension receivable in said transverse groove in interlocking engagement when said rear and third body sections are in their extended positions.

5. A collapsible trailer as set forth in claim 4, including a cushioning member carried by the lower marginal edge of said tongue extension and compressible against the adjacent surface of said transverse groove, and means carried by one of said overlapping top walls and engageable with the other for exerting compression between said cushioning member and the engaging surface of said groove.

References Cited in the file of this patent

UNITED STATES PATENTS

| Number | Name | Date |
|---|---|---|
| 384,402 | Teal | June 12, 1888 |
| 2,119,154 | Downing | May 31, 1938 |
| 2,188,545 | Smelker | Jan. 30, 1940 |
| 2,493,368 | Smelker | Jan. 3, 1950 |
| 2,567,516 | Jones | Sept. 11, 1951 |

FOREIGN PATENTS

| Number | Country | Date |
|---|---|---|
| 683,648 | France | Mar. 4, 1930 |